(12) United States Patent
Martinez et al.

(10) Patent No.: US 8,566,609 B2
(45) Date of Patent: Oct. 22, 2013

(54) INTEGRITY OF CIPHERED DATA

(75) Inventors: Albert Martinez, Bouc Bel Air (FR); Yannick Teglia, Marseilles (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 612 days.

(21) Appl. No.: 12/547,357

(22) Filed: Aug. 25, 2009

(65) Prior Publication Data
US 2010/0070779 A1  Mar. 18, 2010

(30) Foreign Application Priority Data

Aug. 27, 2008 (FR) ...................................... 08 55743

(51) Int. Cl.
*G06F 21/00* (2013.01)
(52) U.S. Cl.
USPC .......................................... 713/189; 713/187
(58) Field of Classification Search
USPC ............................................ 713/189; 380/28
See application file for complete search history.

(56) References Cited

U.S. PATENT DOCUMENTS

| | | | | |
|---|---|---|---|---|
| 4,995,081 A * | 2/1991 | Leighton et al. | ............... | 713/186 |
| 5,442,645 A * | 8/1995 | Ugon et al. | ................... | 714/736 |
| 6,832,316 B1 * | 12/2004 | Sibert | ........................... | 713/181 |
| 8,429,417 B2 * | 4/2013 | Salgado et al. | ............... | 713/187 |
| 2002/0169971 A1 * | 11/2002 | Asano et al. | .................. | 713/193 |
| 2003/0233559 A1 * | 12/2003 | Asano et al. | .................. | 713/189 |
| 2008/0095360 A1 * | 4/2008 | Vuillaume et al. | .............. | 380/44 |
| 2010/0077225 A1 * | 3/2010 | Salgado et al. | ............... | 713/189 |

OTHER PUBLICATIONS

French Search Report dated May 29, 2009, from corresponding French Patent Application No. 08/55743.
Brian Rogers et al:, "Using Address Independent Seed Encryption and Bonsai Merkle Trees to Make Secure Processors OS and Performance-Friendly." Microarchitecture, 2007. Micro 2007. 40th, Annual IEEE/ACM International Symposium, on, IEEE, Piscataway, NJ, USA, Dec. 1, 2007, pp. 183-196, XP031194141.
Suh, G.E., et al:, "Efficient memory integrity verification and encryption for secure processors." Microarchitecture, 2003. MICRO-36, Proceedings. 36th Annual IEEE/ACM International Symposium on Dec. 3-5, 2003, Piscataway, NJ, USA,IEEE, Dec. 3, 2003, pp. 339-350, XPOI674685.

* cited by examiner

*Primary Examiner* — Kaveh Abrishamkar
*Assistant Examiner* — Carlos M De Jesus, Jr.
(74) *Attorney, Agent, or Firm* — Wolf, Greenfield & Sacks, P.C.

(57) ABSTRACT

A method for protecting the integrity of data ciphered by a ciphering algorithm providing at least an intermediary state meant to be identical in ciphering and in deciphering, this intermediary state being sampled during the ciphering to generate a signature.

22 Claims, 6 Drawing Sheets

INTEGRITY OF CIPHERED DATA

CROSS REFERENCE TO RELATED APPLICATIONS

This application claims the priority benefit of French patent application number 08/55743, filed on Aug. 27, 2008, entitled "INTEGRITY OF CIPHERED DATA," which is hereby incorporated by reference to the maximum extent allowable by law.

BACKGROUND OF THE INVENTION

1. Field of the Invention

The present disclosure generally relates to electronic circuits and, more specifically, to the control of the integrity of ciphered data.

The present disclosure more specifically applies to the protection of the privacy and of the integrity (or authenticity) of the content of a memory external to an integrated circuit considered as secure.

2. Discussion of the Related Art

Electronic circuits manipulating data considered as having to remain confidential (not directly accessible by an unauthorized user) and to keep their integrity or authenticity (not modifiable by an unauthorized circuit) generally contain elements for storing these data in an area considered as secure, that is, from which the signals are not exploitable to discover the manipulated data. However, for bulk reasons, the manipulated data or the programs are generally stored in memories external to the secure area, be the memory integrated or not in a same circuit as the secure area.

It is often insufficient to content oneself with a protection of the data by a ciphering before storage into the memory. In particular, the data may then be sensitive to so-called replay attacks which intercept the ciphered data on the data buses between the secure area and the memory, to send them back slightly modified and see how the secure processor behaves. Such attacks enable, by making several successive assumptions, to discover the secret (secret key or used algorithm) of the manipulated data.

To remedy this vulnerability, an additional information (tag) is added to the data stored in the memory. This tag is a random number added to the data before ciphering, and which is stored in the external memory together with the result of the ciphering.

The use of random tags completing the data before ciphering takes up space in the memory. Further, this lengthens the data processing time.

SUMMARY OF THE INVENTION

It would be desirable to be able to protect the privacy and the integrity of data or of programs stored in a memory external to a processor, while requiring less space than usual solutions.

It would also be desirable to decrease processing times with respect to known solutions.

To achieve all or part of these objects as well as others, at least one embodiment of the present invention provides a method for protecting the integrity of data ciphered by a ciphering algorithm providing at least one intermediary state meant to be identical in ciphering and in deciphering, this intermediary state being sampled during the ciphering to generate a signature provided in addition to the ciphered data.

According to an embodiment of the present invention, the signature is stored, together with the ciphered data, in a memory external to a processor executing the ciphering algorithm.

According to an embodiment of the present invention, several signatures are gathered to be submitted to a ciphering, before being stored in the external memory.

According to an embodiment of the present invention, several signatures are combined with part of the data to be ciphered, before being stored together with the ciphered data in the memory.

According to an embodiment of the present invention, the ciphering algorithm comprises several successive iterations, the intermediary state being sampled at the end of one of the iterations except for the last one.

According to an embodiment of the present invention, the ciphering algorithm is a symmetrical algorithm, preferably of AES type.

According to an embodiment of the present invention, the intermediary state corresponds to a state provided by the algorithm between the fourth and ninth iterations.

According to an embodiment of the present invention, the signature is calculated by an XOR-type combination of portions of the intermediary result.

According to an embodiment of the present invention, the ciphering algorithm is an asymmetrical algorithm, preferably of RSA type.

An embodiment of the present invention also provides a method for recording data in a memory, wherein the data are submitted to a ciphering algorithm and to a signature calculation.

An embodiment of the present invention also provides a method for reading data stored in a memory, wherein the ciphered data are submitted to the deciphering algorithm, an intermediary state being sampled during the deciphering to verify the signature.

An embodiment of the present invention also provides an electronic system comprising a processing unit and a memory external to this processing unit in which data must be stored in ciphered form, comprising means for implementing the recording method and the reading method.

The foregoing objects, features, and advantages of the present invention will be discussed in detail in the following non-limiting description of specific embodiments in connection with the accompanying drawings.

DETAILED DESCRIPTION

The same elements have been designated with the same reference numerals in the different drawings.

For clarity, only those elements and steps which are useful to the understanding of the present invention have been shown and will be described. In particular, the details of the steps of the ciphering algorithms as well as the details of the signature calculation process have not been discussed, the present invention being compatible with usual techniques. Further, the destination of the data or programs processed by the privacy and integrity protection mechanisms has not been detailed either, the present invention being here again compatible with usual exploitations of such data and programs.

Figure 1:
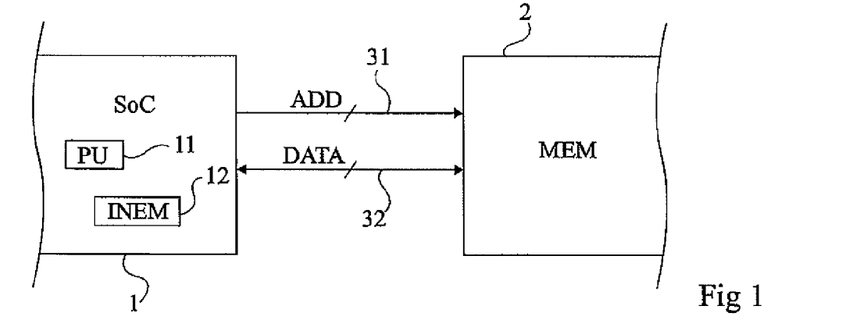
FIG. 1 is a block diagram of an electronic system of the type to which the present invention applies as an example.

FIG. 1 is a simplified block diagram of a system of the type to which the present invention applies as an example. A system made in the form of an integrated circuit 1 (SoC), generally designated as a system-on-chip, is capable of communicating with an external memory 2 (MEM), for example, via an address bus ADD 31 and a data bus DATA 32, to which a control bus (not shown) is generally added. Circuit 1 is considered as secure as to the privacy and the integrity of the data that it manipulates. The system generally comprises many circuits, among which at least one processing unit 11 (PU) and at least one internal storage element 12 (IMEM). Memory 2 is intended to contain all or part of application programs executed by circuit 1 and/or data manipulated by this circuit. Reference will be made hereafter to "data" to indifferently designate program instructions and actual data.

As an embodiment, circuit 1 is a digital processor of multimedia contents in a toll television or multimedia data controlled reading system. Circuit 1 may be contained in a chip card or the like.

According to another example, circuit 1 is a processor for ciphering a secure USB flash drive or the SoC of a cell phone.

Figure 2:
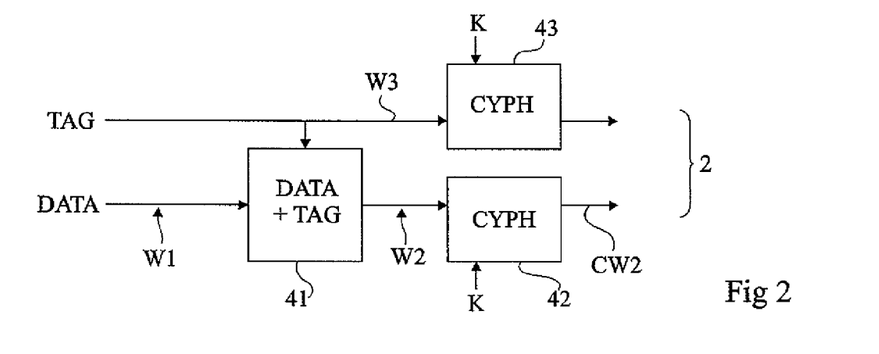
FIG. 2 is a functional block diagram of a usual privacy and integrity protection method.

FIG. 2 illustrates, in the form of blocks, an example of a usual process aiming at protecting the privacy and the integrity of data transiting between circuit 1 and memory 2.

Figure 3:
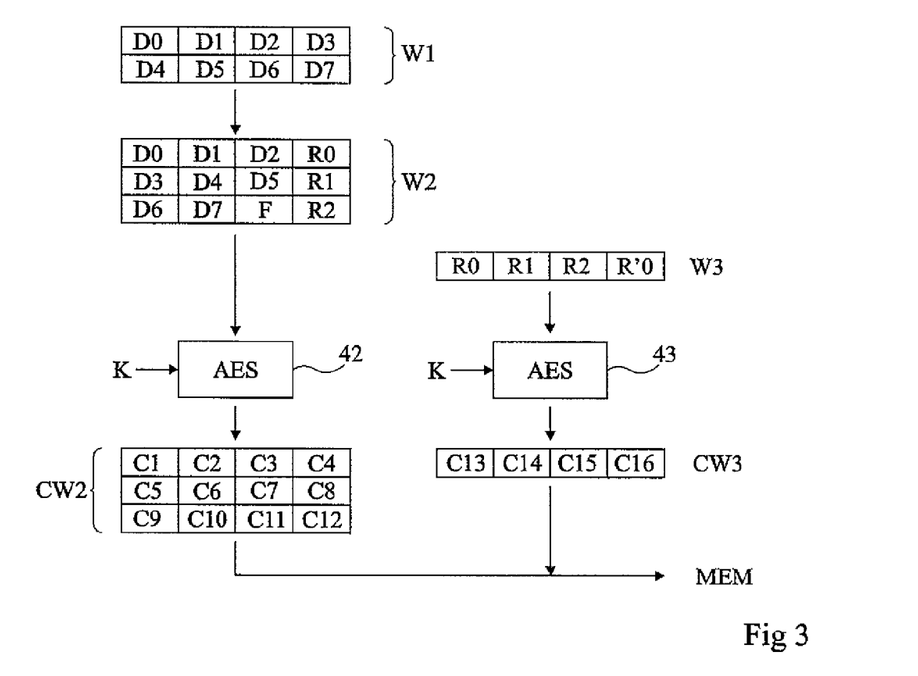
FIG. 3 illustrates the operation of the process of FIG. 2 applied to an AES algorithm.

FIG. 3 illustrates an example of a processing performed by the process of FIG. 2 with an AES-type ciphering algorithm.

Data to be processed DATA are, for example, divided into sets W1 formed of eight words D0 to D7 of 32 bits each (FIG. 3). A first step (block 41, DATA+TAG) comprises associating a tag or a marker to these data. Typically, tags R0, R1, and R2 are random numbers over 32 bits which are associated to the eight data words D0 to D7 to form a set W2 of three 128-bit words. One of the 32-bit words of word W2 needs to be subject to any filling F to obtain three 128-bit words, each comprising one of tags R0 to R2 over 32 bits. The words in set W2 are then submitted (block 42, CYPH—FIG. 2, or AES—FIG. 3) to a ciphering process, for example, of AES type, with a key K which provides a ciphered set CW2 of three 128-bit words comprising each of 32-bit words C1 to C12. Simultaneously, tags R0 to R2 are associated with an additional (random) tag R'0 to form a 128-bit word W3. Word W3 is submitted (block 43, CYPH—FIG. 2, or AES—FIG. 3) to the same ciphering algorithm with key K to obtain a 128-bit word CW3 comprising four 32-bit words C13 to C16. The sixteen 32-bit words (sets CW2 and CW3) resulting from the ciphering are stored in external memory 2. Thus, 128 tag bits are required to protect 256 data bits and 512 bits are required in the memory to store the result of the ciphering and the tags. Further, the adjunction of words R0, R1, R2, and F generates a shift in the memory and thus requires a specific address management when processing unit 1 desires to fetch data from the memory.

It would be desirable to simplify the process and especially the volume of data stored in the memory without adversely affecting the security in terms of privacy and integrity of the data.

Figure 4:
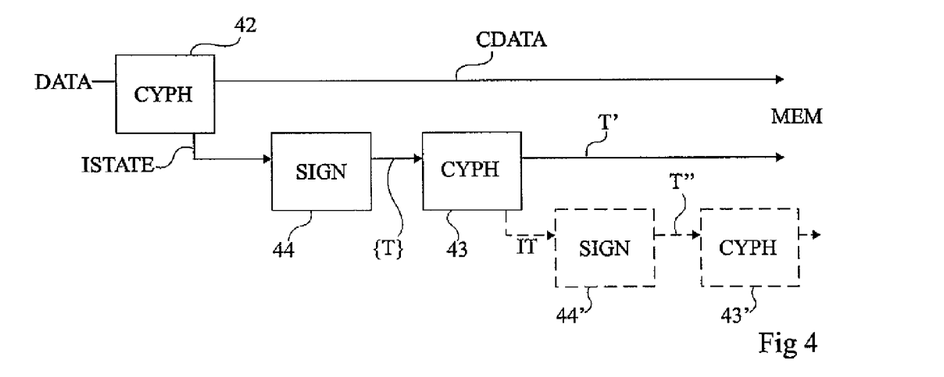
FIG. 4 is a block diagram illustrating an embodiment of a data privacy and integrity protection method.

FIG. 4 is a block diagram illustrating a data privacy and integrity protection process. This diagram should be compared with that of previously-described FIG. 2.

Data DATA to be stored in the memory are submitted to a ciphering algorithm (block 42, CYPH) to protect their privacy. The result (CDATA) is intended to be directly stored in memory MEM (2, FIG. 1) external to the processing circuit. Intermediary states of the executed ciphering algorithm (ISTATE) are sampled during the execution of this algorithm and are submitted to a signature calculation (block 44, SIGN), for example, of MAC (Message Authentication Code) type. Each signature has a size (for example, 32 bits) smaller than that of the word (for example, 128 bits) from which it results. The signed result forms a tag T of protection against a lack of integrity of the corresponding word. In the example of FIG. 4, several signatures T are gathered in a set {T} to be submitted to the ciphering algorithm (block 43, CYPH) and the result T' of this ciphering is stored in the memory. Preferably (dotted lines of FIG. 4), ciphering 43 of the signature is submitted to the same process of extraction of an intermediary state IT for a signature calculation 44' followed, if need be, by a ciphering algorithm 43'. This is used to build a signature tree having its root stored in integrated circuit 1.

Figure 5:
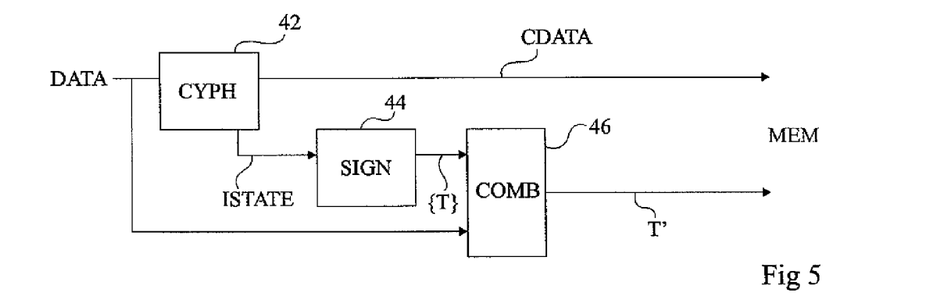
FIG. 5 is a block diagram illustrating another embodiment of a data privacy and integrity protection method.

FIG. 5 is a block diagram of another embodiment in which the ciphering (43, FIG. 4) of the set {T} of signatures provided by block 44 is replaced with a combination 46 (COMB) of these signatures with part of non-ciphered data DATA. Result T' of the combination is stored in external memory MEM with ciphered data CDATA.

Figure 6:
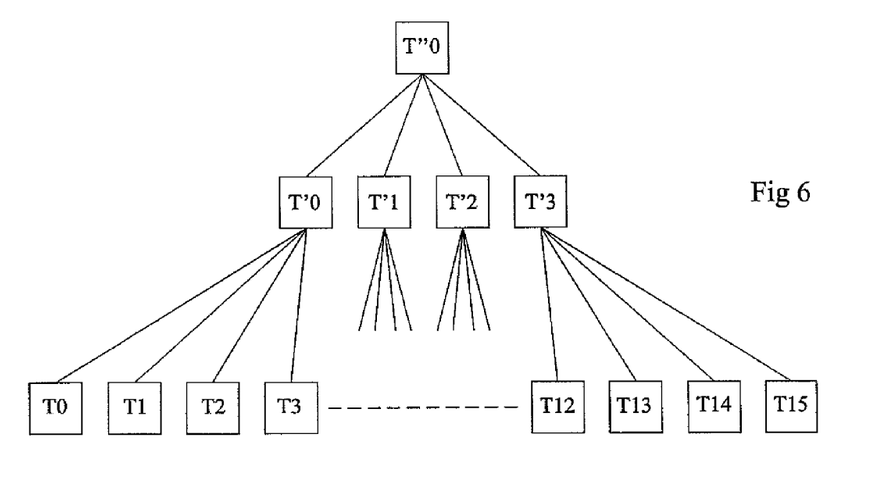
FIG. 6 shows an example of signature processing tree according to an embodiment of the present invention.

FIG. 6 schematically illustrates an example of a signature tree used for the integrity check in the process of FIG. 4. Respective signatures T0 to T15 of the data words submitted to ciphering algorithm 42 (with the word granularity adapted to the algorithm) are submitted, during the operation of ciphering of a set {T} of signatures (for example, respectively T0 to T3, T4 to T7, T8 to T11, and T12 to T15), to an extraction of an intermediary state IT to generate an intermediary signature, respectively T'0, T'1, T'2, and T'3. The intermediary signatures are gathered and ciphered to generate a basic signature T"0 of sufficiently small size to be stored, preferably, in the internal memory (12, FIG. 1) of processing circuit 1. This enables ensuring the integrity of the signatures in a reading from the memory. Intermediary signatures T'0 to T'3 are not necessarily kept once root T"0 has been calculated. Their storage in the external memory however enables to gain time by avoiding recalculating all signatures for verification.

Figure 7:
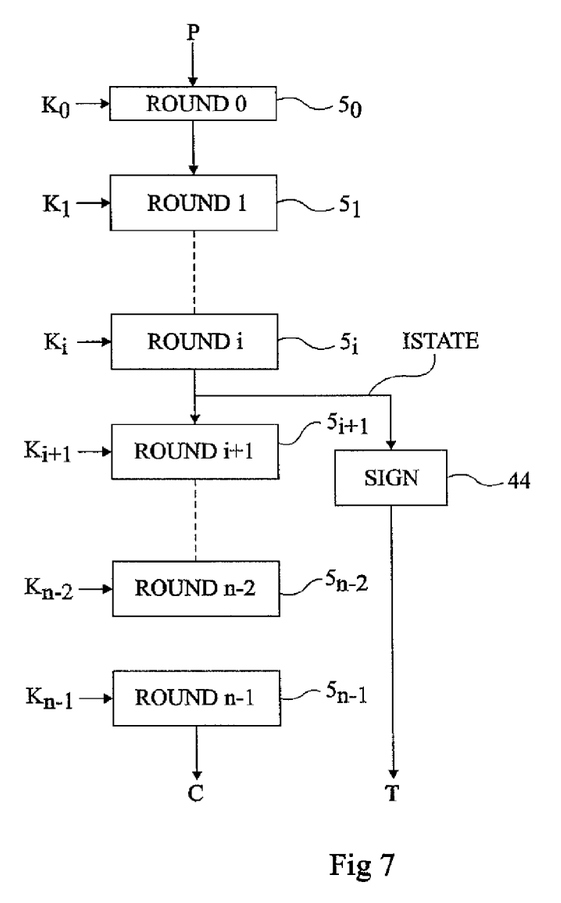
FIG. 7 is a simplified flowchart of an embodiment of a ciphering method implementing an AES-type algorithm and a signature calculation.

FIG. 7 is a simplified flowchart of the execution of an algorithm (for example, of AES type) executing iterations (rounds) of same ciphering steps by exploiting the result of the previous step and a different key (sub-key). A plain text P submitted to the AES algorithm is first submitted to a first round (block $5_0$ROUND 0) with a first sub-key $K_0$. The intermediary result is submitted to the next ciphering round (block $5_1$, ROUND 1) with a sub-key $K_1$ and so on block $5_i$, block $5_{i+1}$, block $5_{n-2}$, block $5_{n-1}$, to end with a last round n−1 having its result providing ciphered text C.

An intermediary result ISTATE is sampled between two ciphering rounds (in the example, between the rounds of rank i and i+1) and is submitted to a signature calculation (block 44, SIGN), the result of which provides signature T. The size of signature T is smaller than the size of intermediary state ISTATE.

Figure 8A:
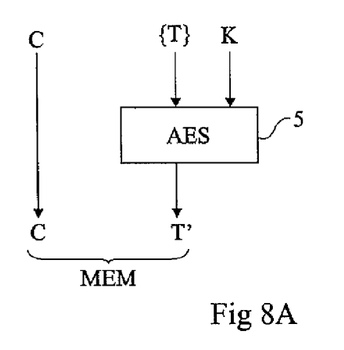
FIG. 8A illustrates an embodiment of a step subsequent to the steps of FIG. 7.
Figure 8B:
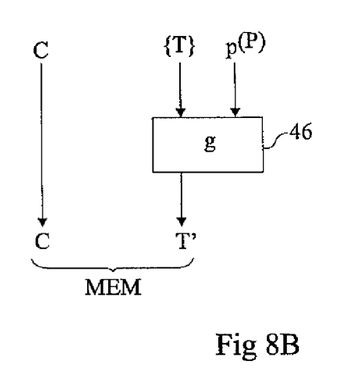
FIG. 8B illustrates another embodiment of a step subsequent to the steps of FIG. 7.

FIGS. 8A and 8B illustrate two possible exploitations of the signature and of the ciphered text, respectively corresponding to the embodiments of FIGS. 4 and 5.

Figure 9A:
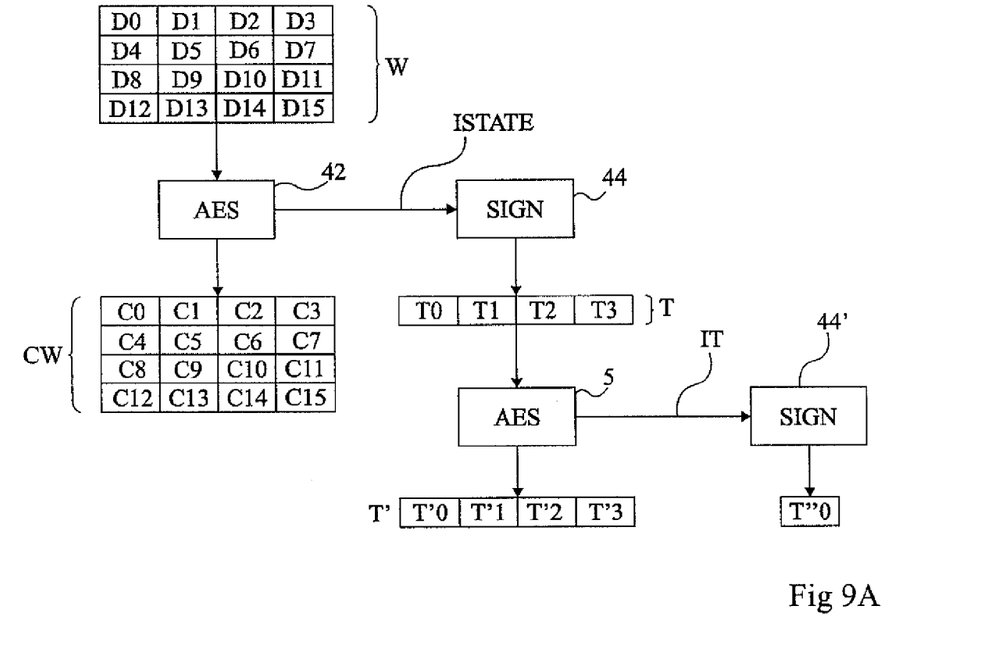
FIG. 9A illustrates the operation of the process of FIG. 7 in the implementation of FIG. 8A.
Figure 9B:
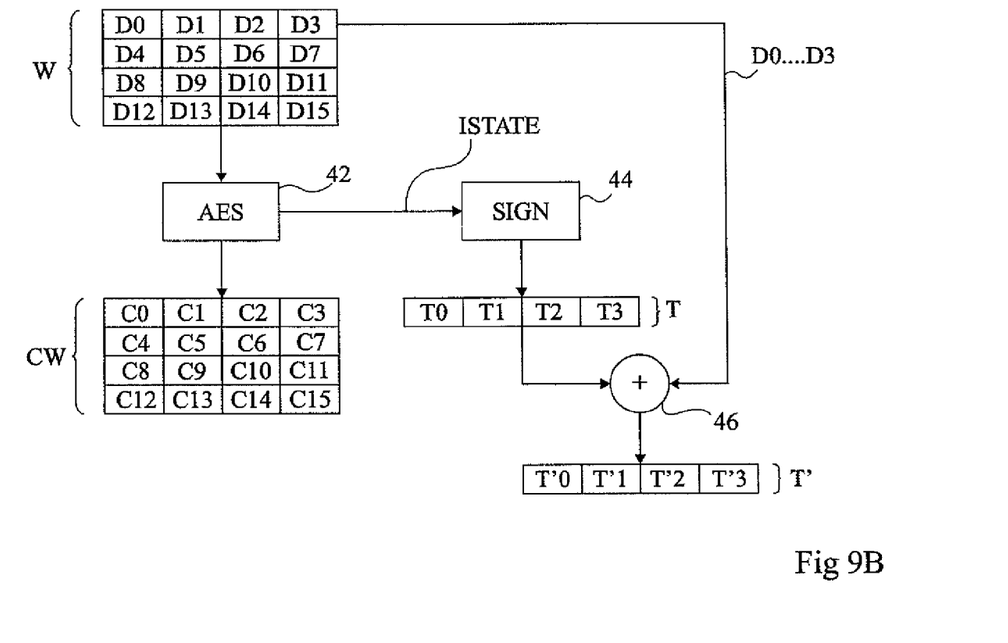
FIG. 9B illustrates the operation of the process of FIG. 7 in the implementation of FIG. 8B.

FIGS. 9A and 9B are representations respectively illustrating the operation of the algorithms of FIGS. 8A and 8B. These drawings should be compared with FIG. 3.

In the example of FIG. 8A, the signatures T obtained from the intermediary states for several data words are gathered, respecting the granularity of the used ciphering algorithm—for example, four 32-bit words, to obtain a signature set or word {T}. Set {T} is submitted to the ciphering (for example, AES, FIG. 5) by application, for example, of the same key as that used for the data ciphering. A ciphered signature T' is obtained, which is, for example, stored in memory MEM together with ciphered text C.

As illustrated in FIG. 9A, the data to be ciphered for example appear in the form of 32-bit words D0 to D15 gathered (set W) in four 128-bit words to be processed by the algorithm, to obtain a group CW of ciphered words, each comprising four 32-bit words C0 to C15. In fact, each 512-bit word W is processed in 128-bit words by the AES algorithm (block 42) and a 128-bit intermediary state ISTATE is sampled for each of these 128-bit words. Each intermediary state is submitted to a signature calculation 44 which results in a 32-bit word, respectively T0 to T3. The four 32-bit words are then submitted (set T) to the AES algorithm (block 5), which provides a set or word T' of ciphered signatures T'0 to T'3. An intermediary state IT (FIG. 4) is preferably sampled from the execution of block 5 to be submitted to signature calculation 44', thus resulting in a 32-bit word T"0. The intermediary calculations are preferably carried on until a word representing the root of a signature tree is obtained. On each gathering of signatures to move up one level in the tree, the set of gathered signatures is preferably ciphered (block 43, 43', FIG. 4).

In the example of FIG. 8B, set {T} of signatures is combined by a function g (block 46) with part of the original data p(P) to provide signature T'.

As illustrated in FIG. 9B, this translates as a combination (for example, a bitwise addition 46) of words T0 to T3 with a portion of same size (for example, the first 128-bit plain data word D0-D3).

The function g used to combine the signature with part of the original data must respect the property according to which combining an operand with the result provides the other operand. In other words, noting x and y the two operands and z the result (z=g(x, y)), function g must be commutative (z=g(y, x)) and respect:

$x=g(z,y)=g(y,z)$; and $y=g(z,x)=g(x,z)$.

These properties correspond to those of the XOR function which is a particularly simple and preferred embodiment.

The fact of replacing a random tag (FIGS. 2 and 3) with an intermediary result of the ciphering algorithm submitted to a signature mechanism decreases the memory space necessary for the storage. For example, sixteen 32-bit data words forming the initial data flow may be stored with ciphered signatures over 128 bits (four 32-bit words respectively assigned by group of four words to the data). Accordingly, five 128-bit words (four data words, one signature word) are then sufficient while eight 128-bit words (four data words, four signature words) are necessary with the solution of FIG. 3.

The selection of the ciphering algorithm iteration from which the intermediary state is sampled depends on the type of used algorithm. It is generally tried to benefit from the diffusion effect of the algorithm. In the AES example, such an intermediary state sampling may occur from the fourth iteration. The intermediary state is sampled before the last round of the algorithm, that is, the state submitted to the signature calculation does not correspond to the obtained ciphered text. This ensures the nesting of the signature calculation and of the ciphering, and improves the security in terms of privacy and integrity.

The fact for the tag or signature to depend on the data (intermediary state) simplifies the storage. In particular, it is not necessary to nest the signature with the plain data. The ciphered data can thus be stored in a simple manner. When it is stored outside of circuit 1, it is preferentially also submitted to the same ciphering. As a variation, if the memory capacity of circuit 1 is sufficient, the calculated signatures (not necessarily ciphered) may be stored therein.

Further, by combining the signature calculation and the ciphering, the execution of the ciphering algorithm becomes protected from the iteration from which the intermediary result is sampled. Accordingly, due to the signatures, an attack on the integrity of the data can be indirectly detected.

In the embodiment of FIG. 8B, the fact of taking into account data of the original text enables to protect the execution of the algorithm from the start while it is otherwise only protected from round i+1.

Preferably, the signature calculation is an XOR combination of portions (for example, of 32 bits) of the word forming the intermediary state (for example, of 128 bits). This provides a simple and sufficiently efficient calculation.

Figures 10, 11A, 11B, 11C:
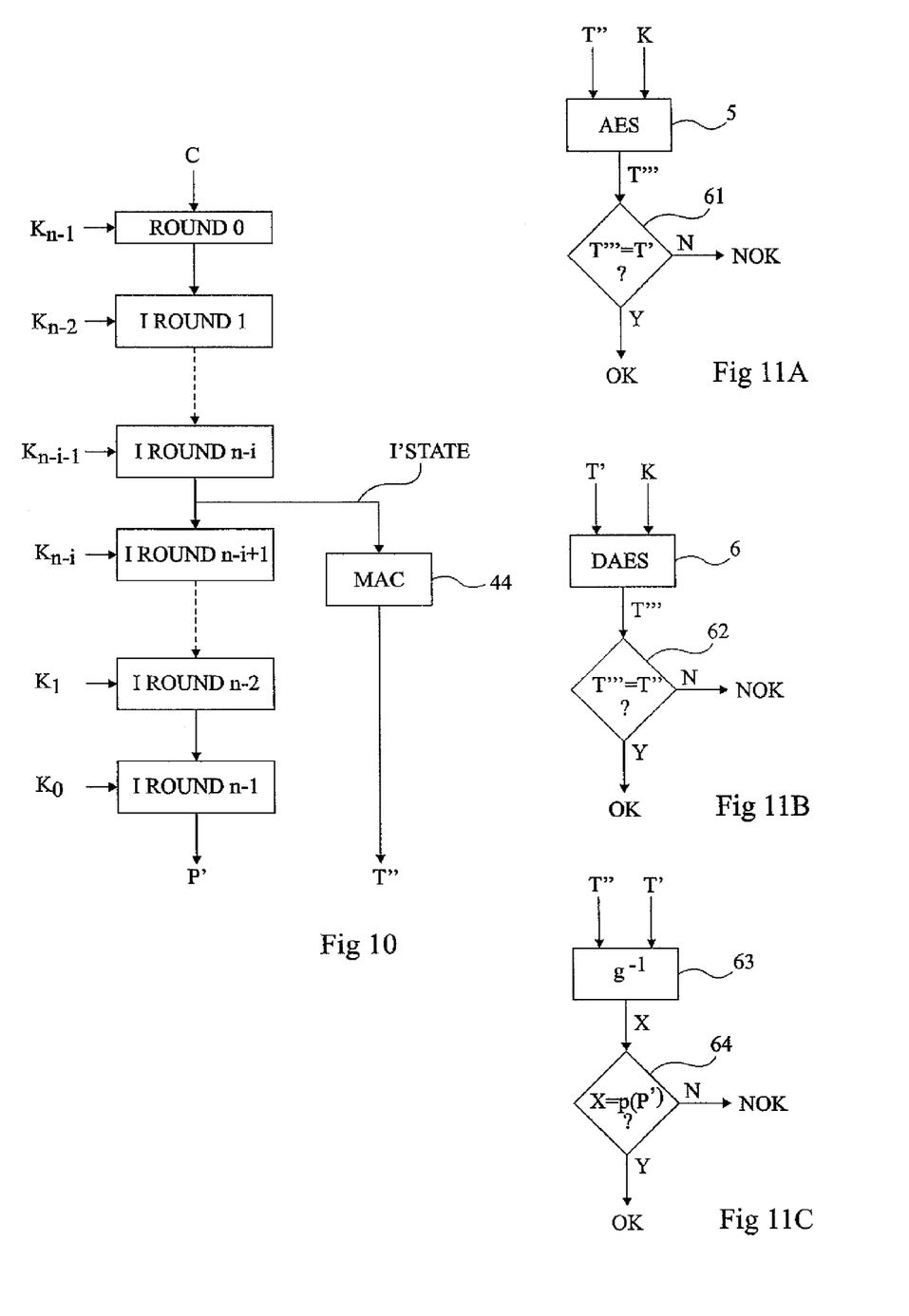
FIG. 10 is a simplified flowchart of an embodiment of a deciphering method implementing an AES-type algorithm.
FIGS. 11A, 11B, and 11C illustrate three examples of verification of a signature obtained by the method of FIG. 10.

FIG. 10 is a flowchart to be compared with that of FIG. 7 illustrating the deciphering of data extracted from the memory. This deciphering comprises applying, to a ciphered text C, the iterations of the algorithm in a reverse order to obtain a deciphered text P'. According to the used algorithm, these iterations correspond to operations IROUND inverse to those of the ciphering algorithm or to the same operations. Generally, keys $K_0$ to $K_{n-1}$ are also used in a reverse order. Between iterations n−i and n−i+1, an intermediary result I'STATE is sampled and submitted to the same signature calculation (block 44, MAC) than during the ciphering, to obtain a signature T"'. The selection of the iteration (n−1) after which the intermediary state is sampled during the deciphering depends on the iteration (i) after which it has been sampled during the ciphering. This needs to respect the fact that the intermediary state obtained in the deciphering is, if the integrity of the data has been respected, identical to the state sampled during the ciphering.

The iteration at which the intermediary state is sampled may be made variable (random, sequential, on each execution, periodically, etc.), provided to be able to recover the corresponding intermediary state in the deciphering. This thus requires storing data enabling to recover the iteration.

FIGS. 11A, 11B, and 11C illustrate three possible signature verification modes.

FIG. 11A corresponds to a first example of application linked to the solution of FIG. 8A in which signature T" is submitted to a ciphering by the same algorithm (block 5, AES) with key K to obtain a signature T" which is compared (block 61, T'''=T'?) with signature T' stored with the data. The result of this test validates (OK—output Y of block 61) or invalidates (NOK—output N of block 61) the deciphering in terms of integrity of the data.

FIG. 11B illustrates a second example applied to a ciphering of the type in FIG. 8A, where the stored signature T' is submitted to an inverse ciphering (block 6, DAES) to obtain a deciphered signature T''' which is compared (block 62, T'''=T"?) with signature T" obtained in the deciphering of the ciphered data. Result OK/NOK of the comparison provides the data integrity result.

FIG. 11C illustrates a deciphering in the case of a ciphering performed according to FIG. 11B. Signature T" obtained by the deciphering of the data is combined with the signature T' stored by a reverse function $g^{-1}$ (block 63). The obtained result X is compared (block 64, X=p(P')?) with portion p(P') of data P' obtained by the deciphering which is selected to correspond to that taken into account at the ciphering (for example, the first four 32-bit words D0 to D3 of the deciphered data). The result OK/NOK of this comparison provides the result of the verification.

Examples of implementation of the AES algorithm, with or without masking with random numbers, to which the above-described embodiments may apply, are discussed in U.S. Pat. No. 7,403,620 (02-RO-148, B5532) and in International application WO-A-107138 (02-RO-451, B5581). For an implementation with a random number introduced in the ciphering algorithm, it will be ascertained to unmask the intermediary state for the signature calculation.

The implementation of the described embodiments may be performed with any size of AES algorithm (128, 192, 256 bits).

The implementation requires no additional circuit for the signature generation. In particular, no random number generation circuit is required for this protection function.

The signature verification may be performed in parallel before the end of the deciphering (as soon as the intermediary state has been sampled). Accordingly, the integrity (or authenticity) verification is faster.

Although the present invention has been more specifically described with the AES algorithm, any symmetrical ciphering algorithm having an intermediary state in common between the ciphering and the deciphering may be used.

Further, any asymmetrical ciphering algorithm respecting the property of having a same intermediary state for the ciphering and the deciphering may be used. For example, an algorithm of RSA type may be implemented.

Figure 12:
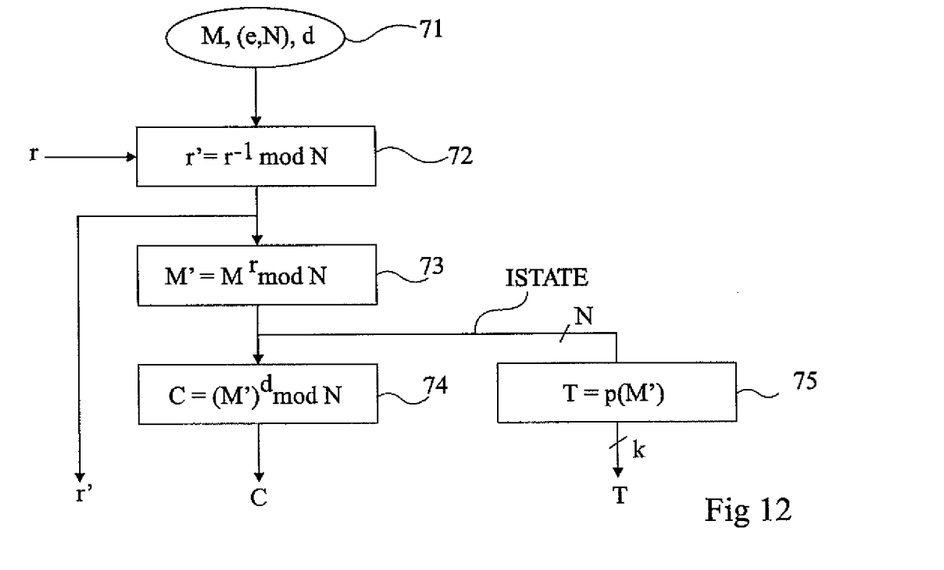
FIG. 12 is a simplified flowchart of an embodiment of a ciphering method implementing an RSA-type algorithm and a signature calculation.

FIG. 12 is a simplified flowchart of an embodiment of a ciphering and signature calculation using the RSA algorithm.

A message M (block 71) to be ciphered by using a public key (e, N) and a private key (d) of the RSA algorithm is introduced into the processing circuit, with N representing the modulo of the operations (for example, 1024 bits).

Circuit 1 starts (block 72) by taking a randomly-generated number r (for example, over 32 bits) and by calculating $r'=r^{-1}$ mod N.

Then, circuit 1 calculates (block 73) a value $M'=M^r$ mod N which represents the intermediary state used for the signature calculation.

The ciphering carries on (block 74) with value M' by calculating $(M')^d$ mod N, which provides ciphered message C (which also is equal to $(M^r)^d$ mod N or $M^{rd}$ mod N).

On the signature calculation side, circuit 1 for example samples a portion p(M') of the intermediary state to form signature T. For example, k bits (for example, 32 bits) of the N bits of value M' are sampled.

As a variation, a combination of several intermediary states successively obtained for several messages M may be provided, in a manner similar to that illustrated in relation with the AES algorithm, as well as a ciphering of the signatures.

Values C, r', and T are stored in external memory 2.

Figure 13:
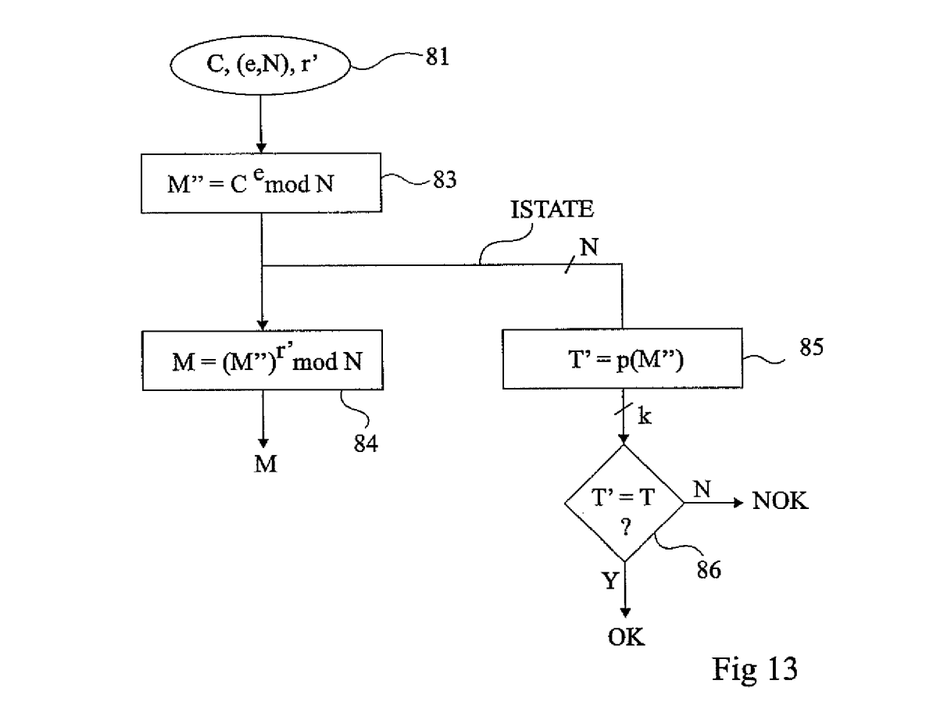
FIG. 13 is a simplified flowchart of an embodiment of a deciphering method implementing an RSA-type algorithm and a signature verification.

FIG. 13 is a simplified flowchart of an embodiment of the deciphering and signature verification using the RSA algorithm.

It is started (block 81) from values C and r' stored in memory 2 and from public key (e, N) which is, for example, contained in storage element 12 of circuit 1.

Circuit 1 calculates (block 83) a value $M''=C^e$ mod N (which is equal to $(M^{rd})^e$ mod N or to $M^r$ mod N), which represents intermediary state ISTATE.

Then, circuit 1 calculates (block 84) deciphered message M by calculating $(M'')^{r'}$ mod N.

On the signature verification side, intermediary state ISTATE undergoes the same extraction of a portion over k bits (block 85, T'=p(M")) than during the ciphering. The obtained value T' is finally compared with signature T (block 86, T'=T?) to validate or not the integrity of the message.

In the example of an asymmetrical ciphering, the random number used for the ciphering needs not be secret to ensure the integrity.

Various embodiments of the present invention have been described. Different alterations and modifications will occur to those skilled in the art. In particular, although the present invention has been more specifically described in relation with AES and RSA algorithms, it more generally applies to any symmetrical or asymmetrical algorithm respecting the indicated properties. Further, the practical implementation of the present invention based on the functional indications given hereinabove is within the abilities of those skilled in the art. The elements illustrated by blocks (especially 42 to 44, 43', 44', 46, 5, 6, 61 to 64, 72 to 75, 82 to 86) in the drawings may correspond to dedicated hardware processing circuits (state machine in wired logic, programmable gate array—FPGA) or to software functions.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method for protecting the integrity of data ciphered by a ciphering algorithm providing at least one intermediary state meant to be identical in ciphering and deciphering, comprising:

sampling, by a processing unit of an integrated circuit, several intermediary states resulting from ciphering of the data;

generating, by the processing unit, several signatures based on the several sampled intermediary states;

gathering, by the processing unit, the several signatures and processing the gathered signatures to obtain a result; and providing, by the processing unit, the result of processing the gathered signatures in addition to the ciphered data, wherein the result is stored, together with the ciphered data, in a memory external to the integrated circuit executing the ciphering algorithm, wherein the gathered signatures are combined by an XOR function with part of the data to be ciphered, and wherein the result is stored together with the ciphered data in the memory.

2. The method of claim 1, wherein the gathered signatures are submitted to a ciphering, and a result of the ciphering is stored in the external memory.

3. The method of claim 1, wherein the ciphering algorithm comprises several successive iterations, each of the intermediary states being sampled at the end of one of the iterations except for the last iteration.

4. The method of claim 3, wherein the ciphering algorithm is a symmetrical algorithm.

5. The method of claim 3, wherein each of the intermediary states corresponds to a state provided by the ciphering algorithm between the fourth and ninth iterations.

6. The method of claim 1, wherein each of the several signatures is calculated by an XOR-type combination of portions of each of the intermediary states.

7. The method of claim 1, wherein the ciphering algorithm is an asymmetrical algorithm.

8. A method for reading the ciphered data stored in the memory according to the method of claim 1, wherein the ciphered data is submitted to a deciphering algorithm, the intermediary states being sampled during the deciphering to verify the result.

9. An electronic system comprising the processing unit and the memory external to the processing unit, configured to implement the method of claim 1.

10. The method of claim 4, wherein the symmetrical algorithm is of AES type.

11. The method of claim 7, wherein the asymmetrical algorithm is of RSA type.

12. A method for protecting the integrity of data stored in a memory, comprising:
ciphering data, by a processing unit of an integrated circuit, using a ciphering algorithm having several iterations, to provide ciphered data;
sampling, by the processing unit, several intermediary states of the several iterations during ciphering of the data;
generating, by the processing unit, several signatures based on the several sampled intermediary states;
gathering, by the processing unit, the several signatures and processing the gathered signatures to obtain a result; and
storing, by the processing unit, the ciphered data and the result in the memory, wherein the memory is external to the integrated circuit and wherein processing the gathered signatures comprises combining, by an XOR function, the gathered signatures with part of the data to be ciphered and storing the result in the memory.

13. The method as defined in claim 12, wherein processing the gathered signatures comprises ciphering the gathered signatures and storing a result of the ciphering in the memory.

14. The method as defined in claim 12, wherein sampling the intermediary state of the several iterations comprises sampling an intermediary state of an iteration other than a last iteration.

15. The method as defined in claim 12, wherein generating each of the several signatures comprises performing an XOR combination of portions of each of the intermediary states.

16. The method as defined in claim 12, further comprising reading the ciphered data and the result from the memory, deciphering the data read from the memory using a deciphering algorithm having several iterations, and verifying the result read from the memory.

17. The method as defined in claim 16, wherein verifying the result comprises sampling the intermediary states of the several iterations during deciphering of the data.

18. A system for protecting the integrity of data, comprising:
a processing unit and an internal memory containing instructions configured to:
cipher data, using a ciphering algorithm having several iterations, to provide ciphered data;
sample several intermediary states of the several iterations during ciphering of the data;
generate several signatures based on the several sampled intermediary states;
gather the several signatures and process the gathered signatures to obtain a result; and
store the ciphered data and the result in an external memory, wherein the instructions are further configured to process the gathered signatures by combining, by an XOR function, the gathered signatures with part of the data to be ciphered and to store the result of the combination in the external memory.

19. The system as defined in claim 18, wherein the instructions are further configured to process the gathered signatures by ciphering the gathered signatures and to store a result of the ciphering in the external memory.

20. The system as defined in claim 18, wherein the instructions are configured to generate each of the several signatures by performing an XOR combination of portions of each of the intermediary states.

21. The system as defined in claim 18, wherein the instructions are further configured to read the ciphered data and the result from the external memory, to decipher the data read from the external memory using a deciphering algorithm having several iterations, and to verify the result read from the external memory.

22. The system as defined in claim 21, wherein the instructions to verify the result are configured to sample the intermediary states of the several iterations during deciphering of the data.

* * * * *